United States Patent [19]
Burgwin

[11] 3,772,920
[45] Nov. 20, 1973

[54] ACCELEROMETERS

[75] Inventor: Stephen Lovell Burgwin, Circle Pines, Minn.

[73] Assignee: Honeywell Inc., Minneapolis, Minn.

[22] Filed: Aug. 24, 1970

[21] Appl. No.: 66,169

[52] U.S. Cl. .............................................. 73/517 B
[51] Int. Cl. ........................................... G01p 15/08
[58] Field of Search ..................... 73/516 R, 517 R, 73/517 B, 503; 310/26

[56] References Cited
UNITED STATES PATENTS

| | | | |
|---|---|---|---|
| 2,338,732 | 1/1944 | Nosker | 73/517 R X |
| 3,122,927 | 3/1964 | Chass | 73/517 B |
| 3,007,063 | 10/1961 | Harris | 73/517 X |
| 3,076,343 | 2/1963 | Dumas et al. | 73/517 B |
| 3,288,942 | 11/1966 | Voegeli | 310/26 X |

Primary Examiner—James J. Gill
Attorney—Charles J. Ungemach and Ronald T. Reiling

[57] ABSTRACT

An accelerometer wherein a seismic mass is supported by magnetostrictive supports having preferred initial magnetic domain orientation. Displacement of the seismic mass due to acceleration rotates magnetic domains to change magnetic permeability in the supports; these changes in permeability are measured as an indication of acceleration. A closed loop embodiment feeds back a sensing output to induce a magnetic field opposing domain rotation, achieving domain rebalance. The change in the magnetizing feedback current between the unaccelerated and accelerated states is a measure of acceleration.

4 Claims, 4 Drawing Figures

PATENTED NOV 20 1973 3,772,920

INVENTOR.
STEPHEN L. BURGWIN
BY Ronald T. Reiling
ATTORNEY

ACCELEROMETERS

BACKGROUND OF THE INVENTION

This invention relates to electrical accelerometers, and more particularly presents a magnetostrictive accelerometer.

Most prior art accelerometers measure the acceleration experienced by a seismic mass in terms of its displacement from a mechanically restrained null position or alternatively, the force required to restore null displacement. This approach has over the years posed certain obstacles to a precise yet very rugged accelerometer having a low threshold. Such prior accelerometers are characterized by close geometric tolerances, precisely predictable fluid performance, and careful material selection and quality control. Their demand for a carefully controlled manufacturing and assembly environment further escalates the cost of conventional accelerometers.

Even the most sophisticated mechanical accelerometers involve a trade-off between precise performance, including a low threshold, and ruggedness. Some contemporary applications have identified the need for an accelerometer capable of tolerating an acceleration of several thousand g's while maintaining a threshold of the order of $10^{-6}$ g, one g being defined as the acceleration due to gravity at the Earth's surface. A conventional accelerometer, if in fact able to meet these requirements, would have prohibitive design and manufacturing costs.

BRIEF SUMMARY OF THE INVENTION

In the present accelerometer a seismic mass means is restrained in a frame by magnetostrictive support means such that displacement of the seismic mass means due to acceleration of the seismic mass means relative to the frame rotates magnetic domains in the support means to change the magnetic permeability of the support means. The restraint of the support means is independent of its elastic qualities. That is, the seismic mass means moves in response to acceleration by merely rotating magnetic domains in the support means; movement of the seismic mass means does not dynamically stretch the support means. Sensing means operate to detect changes in magnetic permeability in the support means as a measure of the acceleration experienced by the seismic mass means and to produce an output signal indicative of those changes in permeability.

A closed loop embodiment feeds the sensing means output to a rebalance means to produce a rebalance force opposing magnetic domain rotation in the magnetostrictive support means. In this embodiment, acceleration experienced by the seismic mass means is measured in terms of the rebalance force required to restore the magnetic domain orientation in the support means corresponding to zero acceleration of the seismic mass means.

This approach offers several advantages over prior accelerometers. The movement of the seismic mass is not restricted by the usual elastic or frictional forces, but instead by the magnetic forces required to rotate magnetic domains. Control of the restrictive force is thus not the usual mechanical spring, friction, and fluid floatation problem, but is instead dependent only on the magnetostrictive qualities of the support means. The restrictive force therefore lends itself to simpler and more precise control, resulting in a very reliable and very accurate accelerometer. Unlike conventional accelerometers, structural strength and ruggedness are not compromised to obtain a low threshold; the present accelerometer maintains a threshold of $1 \times 10^{-6}$ g while surviving accelerations at the $10^4$ g level.

The present sensing technique offers high sensitivity and resolution, while allowing simple magnetic domain rebalancing. Both the sensing and rebalance techniques have low power requirements, so the accelerometer may be self-contained and does not require an external power supply. In addition, the simplicity and flexibility of both the accelerometer and the accompanying electronics allow a wide variety of performance ranges, suiting the accelerometer to many applications. The accelerometer is relatively insensitive to environmental effects, so it need not be heated for most control applications. Further more, the accelerometer has no precision moving parts and consequently does not demand the extremely delicate and expensive assembly techniques employed in conventional accelerometers.

DESCRIPTION OF THE PREFERRED EMBODIMENT

Figure 1:
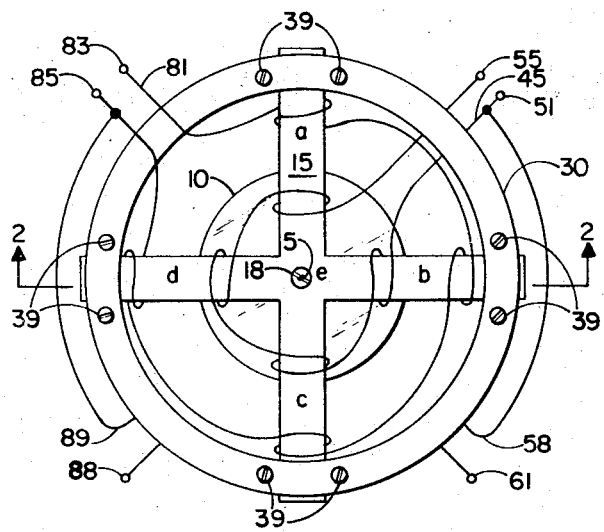
FIG. 1 is a schematic view of the preferred embodiment of my accelerometer.
Figure 2:
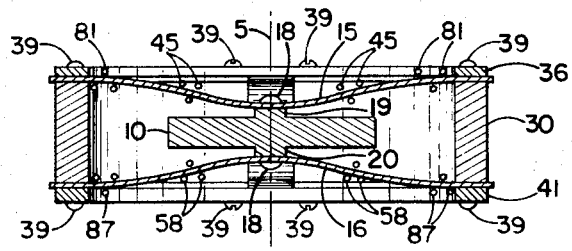
FIG. 2 is a cross-sectional view taken along section line 2—2 of the accelerometer of FIG. 1.

FIGS. 1 and 2 illustrate the preferred embodiment of my accelerometer. Referring to these FIGURES, the accelerometer sensitive axis 5 lies in the plane of FIG. 2 and is perpendicular to the plane of FIG. 1. A seismic mass 10 having circular cross-section is suspended between a first magnetostrictive support 15 and a second similar magnetostrictive support 16. Supports 15 and 16 each comprise four radial arms designated a, b, c, and d, joined at a central portion e such that successive arms are mutually perpendicular. Throughout this description a particular arm will be referred to by a number indicating support 15 or 16 followed by a letter designator indicating the particular arm. For example, reference 15c refers to arm c of support 15. Central portions 15e and 16e are similarly indicated. Support 16, lying directly beneath support 15, is not visible in FIG. 1. A first screw 18 passes through the center of support 15, anchoring in a hub portion 19 of seismic mass 10; a second screw, also designated 18, similarly fastens support 16 to a hub portion 20. Supports 15 and 16 are illustrated as having four radial arms; in practice they might have any number of arms or alternatively, the supports might be bowl shaped, having no arms. The important requirement is that the supports allow limited displacement of seismic mass 10 along sensitive axis 5 while resisting off-axis displacements.

The extremities of arms 15a, b, c, and d are secured between the top surface of an annular frame 30 and an upper retaining ring 36. Retaining ring 36 is fastened to frame 30 by several screws, all designated by reference numeral 39. The extremities of arms 16a, b, c, and d are similarly secured between the lower surface of frame 30 and a lower retaining ring 41.

Supports 15 and 16 are made of magnetostrictive material. Vanadium Permendur has been found to work well, but other magnetostrictive materials will perform in the accelerometer. Supports 15 and 16 are initially biased so that approximately one-half the magnetic domains in each support are aligned radially relative to central portions 15e and 16e, and the remaining one-half are oriented perpendicularly to the first half. Throughout the specification and claims, those magnetic domains aligned radially relative to central portions 15e and 16e will be regarded as "longitudinal." Domains perpendicular to longitudinal domains will be referred to as "cross-oriented." Cross-oriented domains might have any such direction in a plane perpendicular to FIG. 1 and are not necessarily perpendicular to that FIGURE. A preferred method for establishing initial domain orientation will be explained subsequently.

The initial domain orientation will allow seismic mass 10 to move a limited distance in response to acceleration by merely rotating magnetic domains in support 15 and 16. The seismic mass 10 is then in a sense floated by magnetic domains. When seismic mass 10 experiences a downward displacement along the accelerometer sensitive axis 5 as viewed in FIG. 2, a number of the previously cross-oriented domains in support 15 rotate to a longitudinal position. At the same time, a number of the previously longitudinally aligned domains in support 16 rotate to a cross-oriented position. An upward displacement of seismic mass 10 results in support 15 longitudinal domains rotating to a cross-oriented position while support 16 cross-oriented domains rotate to a longitudinal position. In each case the rotation of magnetic domains is directly related to the magnitude and direction of the stress applied to each support due to acceleration of the seismic mass 10.

Frame 30 and retaining rings 36 and 41 are preferably made of a magnetic material to provide a closed path for the magnetic field of longitudinally aligned domains. Utilizing a magnetic material also has the secondary effect of shielding the supports 15 and 16 from extraneous environmental magnetic fields.

A first sensing winding 45, extending from a terminal 51, is first coiled around support arm 15b, then around support arm 15c, around 15d and finally around support arm 15a before returning to a second terminal 55. A second sensing winding 58 extends from terminal 51 around each of the lower support arms 16a, b, c, and d, terminating at another terminal 61. These sensing windings are elements of an AC bridge; this will be explained subsequently.

A magnetizing winding 81, extending from a terminal 83, is individually coiled about each of the upper support arms 15a, b, c, and d, and terminates at a terminal 85. Another magnetizing winding 87 extends from a terminal 88 around each of the lower support arms 16c, b, a, and d, and terminates at terminal 85. Magnetizing windings 81 and 89 are used for magnetic domain rebalancing; this will also be explained subsequently. For clarity, magnetizing windings 81 and 89 as well as sensing windings 45 and 58 are illustrated as having a single turn on each support arm. In practice, approximately fifty turns would be used, although the exact number would of course be dictated by accelerometer size, material selection, and electronic capabilities.

Figure 3:
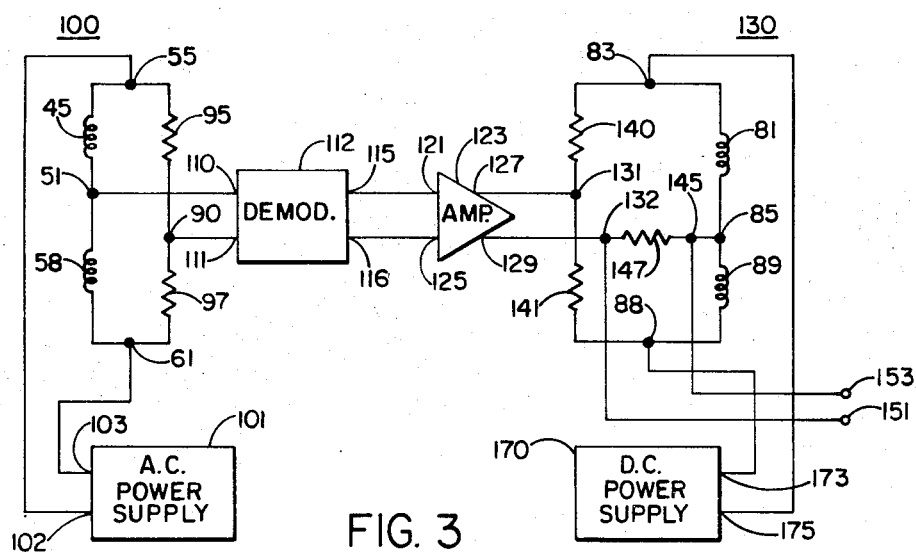
FIG. 3 is a block diagram of the electronics employed with the accelerometer of FIGS. 1 and 2.

FIG. 3 is a block diagram of the electronics employed with the accelerometer of FIGS. 1 and 2. Referring to FIG. 3, sensing winding 45 extends from terminal 51 to terminal 55, and sensing winding 58 extends from terminal 51 to terminal 61. A first resistor 95 is connected between terminal 55 and another terminal 90. A second resistor 97, identical to resistor 95, is connected between terminal 61 and terminal 90, thereby completing a sensing bridge circuit 100 in which terminals 51 and 90 serve as bridge output terminals. An AC power supply 101 has a first output terminal 102 connected to terminal 55 and a second output terminal 103 connected to terminal 61.

Terminal 51 and terminal 90 are connected respectively to a first input 110 and a second input 111 of a demodulator 112. Demodulator 112, known in the art, is essentially a commutator with controlled cross-over; it is operable to produce a pulsating DC output having magnitude and sense determined by the AC signal at its input.

A first demodulator output terminal 115 is connected to an input terminal 121 of an amplifier 123; a second demodulator output terminal 116 is connected to a second input 125 of amplifier 123. Amplifier 123 is a typical transistor operational amplifier, also well known in the art.

The domain rebalancing circuit comprises a bridge circuit 130. A first output terminal 127 of amplifier 123 is connected to a terminal 131; a second output terminal 129 of amplifier 123 is connected to another terminal 132. A first resistor 140 is connected between terminal 131 and terminal 83. A second resistor 141, identical to resistor 140, is connected between terminals 131 and 88. As previously explained, magnetizing winding 81 is connected between terminals 83 and 85; magnetizing winding 89 is connected between terminals 85 and 88. Another terminal 145 is connected to terminal 85, and a resistor 147 is connected between terminals 132 and 145. Terminals 132 and 145 serve as rebalance bridge output terminals. Terminal 132 is connected to a first accelerometer output terminal 151, and terminal 145 is connected to a second accelerometer output terminal 153. A DC power supply 170 has a first output terminal 173 connected to terminal 88 and a second output terminal 175 connected to terminal 83. DC power supply 170 continually supplies DC power across magnetizing windings 81 and 89 to maintain the initial domain orientation explained previously.

The accelerometer of FIGS. 1 and 2 operates as follows. An acceleration along the accelerometer sensitive axis 5 causes seismic mass 10 to move along sensitive axis 5. This movement of seismic mass 10 is allowed by magnetic domain rotation in supports 15 and 16 and does not depend on the elastic qualities of those supports. Consider for example an acceleration tending to displace seismic mass 10 downward along sensitive axis 5 as shown in FIG. 2. As previously explained, this movement would cause cross-oriented domains in support 15 to rotate to the longitudinal position. At the same time, previously longitudinally aligned domains in support 16 rotate to the cross-oriented position. These domain rotations, changing the magnetic permeability in supports 15 and 16, change the inductance of windings 45 and 58. In the instant case, the inductance in the upper sensing winding 45 would increase while the inductance in lower sensing winding 58 would decrease. These inductance changes unbalance the sensing bridge 100, allowing an AC signal to pass from terminals 51 and 90 to demodulator 112. Demodulator 112, essentially a commutator having precisely controlled cross-over, produces a pulsating DC current of magnitude and sense determined by the AC signal supplied to demodulator inputs 110 and 111. The DC demodulator output is amplified by amplifier 123 and transmitted to rebalance bridge 130. The DC signal transmitted to terminal 131 and terminal 85 (via terminal 132, resistor 147, and terminal 145) unbalances the rebalance bridge circuit 130. This results in decreased current through winding 81 and increased current through winding 89. Increased current through winding 89 strengthens the longitudinal magnetic field in lower support 16, consequently rotating cross-oriented magnetic domains in support 16 back to longitudinal orientation. Decreased current through winding 81 weakens the longitudinal magnetic field in support 15, allowing longitudinally oriented domains to rotate to the cross-oriented position. Domain rotation in both supports 15 and 16 will continue until sensing bridge 100 is again balanced. At that time, rebalance bridge 130, utilizing the current from amplifier 123, will also be balanced. The current required to balance rebalance bridge 130 must pass through resistor 147, so a measure of the voltage drop across that resistor, for example at terminals 132 and 145, will be indicative of the current required to restore initial domain orientation and again balance sensing bridge 100. Since the number of domains rotated from initial orientation is proportional to the acceleration experienced by seismic mass 10, the rebalancing current required to reestablish initial domain orientation is proportional to that acceleration. The voltage drop across resistor 147 is transmitted to accelerometer output terminals 151 and 153, where the appropriate voltmeter readout would be connected.

Displacement of seismic mass 10 upward along sensitive axis 5 would unbalance sensing bridge 100 in the opposite sense, accordingly unbalancing rebalance bridge 130 in the opposite sense. This results in increased current passing through winding 81 and decreased current through winding 89. This of course increases the longitudinal magnetic field in support 15, causing cross-oriented domains to rotate to the longitudinal position. At the same time, the reduced longitudinal field in support 16 allows longitudinal domains to rotate to the cross-oriented position. As before, the current, measured in terms of voltage drop across resistor 147, required to restore initial domain orientation is a measure of acceleration experienced by seismic mass 10.

Figure 4:
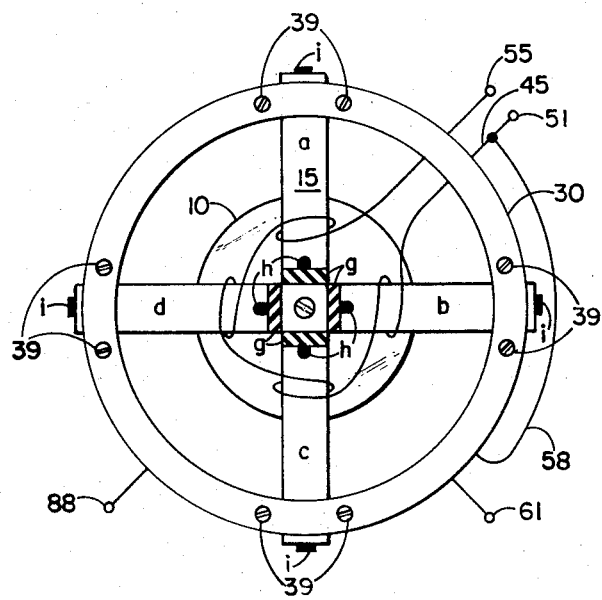
FIG. 4 illustrates an alternate embodiment of my accelerometer.

FIG. 4 illustrates a variation of the accelerometer of FIGS. 1 and 2. In this version, magnetizing windings 81 and 89 are eliminated, and the rebalance current is passed directly through the arms $a$, $b$, $c$, and $d$ of supports 15 and 16. Referring to FIG. 4, in which like numbers indicate elements similar to those of FIGS. 1 and 2, each of the support arms 15$a$, $b$, $c$, and $d$ is electrically insulated from central portion 15$e$ by a strip of insulative material 15$g$. A terminal 15$h$ is provided on each support arm near the insulative strip 15$g$. At the outer end of each support arm 15$a$, $b$, $c$, and $d$ is a second terminal 15$i$. Support 16 is similarly configured, having an insulative strip 16$g$ separating each support arm 16$a$, $b$, $c$, and $d$ from central portion 16$e$, and terminals 16$h$ and 16$i$ at respective ends of each support arm.

This embodiment also employs the electronics of FIG. 3. Referring to FIG. 3, terminal 83 is now connected to terminals 15$i$, terminal 85 is connected to terminals 15$h$ and 16$i$, and terminal 88 is connected to terminals 16$h$. As explained, magnetizing windings 81 and 89 are eliminated.

The operation of this embodiment parallels that of the above-described embodiment except that the rebalancing magnetizing current is now fed directly through the arms of supports 15 and 16 rather than through windings surrounding those arms. In response to downward displacement of seismic mass 10, rebalancing bridge 130 would unbalance to increase the current passing upper support arms 15$a$, $b$, $c$, and $d$, rotating longitudinally aligned domains to the cross-oriented position. At the same time, the current passing through lower support arms 16$a$, $b$, $c$, and $d$ is decreased, in turn allowing cross-oriented domains in support 16 to rotate to the longitudinal position. These rotations would again continue until sensing bridge 100 is balanced. As before the rebalance current, indicative of displacement, is measured at the accelerometer output terminals 151 and 153 in terms of the voltage drop across resistor 147.

The preferred embodiment accelerometer I have illustrated and described is known in the art as a closed loop accelerometer. It is recognized that an open loop accelerometer could employ similar operational principles. In an open loop accelerometer, there would be no rebalance circuit, but instead the sensing bridge 100 output would be measured as an indication of acceleration experienced by seismic mass 10. However, the illustrated closed loop accelerometer has better sensitivity and generally superior performance.

Those skilled in the art will realize that various modifications could be made without departing from the spirit of my accelerometer. For example, initial domain orientation could be achieved by bias stressing or compressing the supports 15 and 16 rather than by employing a bias current through the magnetization windings 81 and 89 or supports 15 and 16, as I have shown. In addition, the physical embodiment could take any number of forms. Finally, other rebalance techniques could be employed. For example, the rebalance could also be accomplished by bias stressing the supports, rather than by magnetic field changes.

I claim as my invention:

1. An accelerometer comprising:

a frame;

a seismic mass;

magnetostrictive supports supporting the seismic mass within the frame for displacement along an axis in response to acceleration along that axis, the displacement being allowed by rotation of magnetic domains within the magnetostrictive supports;

windings surrounding the magnetostrictive supports such that changes in magnetic permeability in the supports due to magnetic domain rotation change the electrical inductance of the windings;

inductance measuring means connected with the windings, the inductance measuring means being operable to measure the inductance of the windings as a measure of the displacement of the seismic mass along the axis in response to acceleration and to produce an output signal indicative thereof; and magnetic rebalance means operably connected with the inductance measuring means to produce a rebalance magnetic field in the magnetostrictive supports to restore magnetic domain orientation in the magnetostrictive supports corresponding to zero displacement of the seismic mass and being further operable to produce an output signal indicative of the magnetic field required to restore that magnetic domain orientation.

2. The apparatus of claim 1 wherein the inductance measuring means comprises an electrical bridge circuit which is balanced when the seismic mass experiencs no displacement and is operable to provide an output signal in response to magnetic permeability changes in the magnetostrictive supports.

3. The apparatus of claim 2 wherein the magnetostrictive supports include a first magnetostrictive support and a second magnetostrictive support with the seismic mass supported between the first magnetostrictive support and the second magnetostrictive support such that displacement of the seismic mass increases magnetic permeability in the first magnetostrictive support and decreases magnetic permeability in the second magnetostrictive support, and the electrical bridge circuit is operable to compare magnetic permeability of the first and second magnetostrictive supports and produce an output signal indicative of a difference in those permeabilities.

4. The apparatus of claim 1 wherein the magnetic rebalance means includes bias means operably connected with the support means to maintain magnetic domain orientation corresponding to zero displacement of the seismic mass means, with approximately one-half the magnetic domains longitudinally aligned and one-half cross oriented.

* * * * *